(12) United States Patent
Hirai et al.

(10) Patent No.: US 7,304,447 B2
(45) Date of Patent: Dec. 4, 2007

(54) MOTOR CONTROLLER

(75) Inventors: Kazuyuki Hirai, Kasugai (JP); Tatsuya Suzuki, Kosai (JP); Shinji Shimoie, Nishikamo-gun (JP); Seiichi Watanabe, Nishikamo-gun (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 11/498,252

(22) Filed: Aug. 3, 2006

(65) Prior Publication Data

US 2007/0058303 A1    Mar. 15, 2007

(30) Foreign Application Priority Data

Aug. 3, 2005    (JP) ............... 2005-225790

(51) Int. Cl.
H02H 5/04    (2006.01)
H02H 7/08    (2006.01)

(52) U.S. Cl. ............... 318/471; 318/434; 361/25

(58) Field of Classification Search ............... 318/434, 318/471–473; 361/23–34; 388/934
See application file for complete search history.

(56) References Cited

U.S. PATENT DOCUMENTS

| | | | | |
|---|---|---|---|---|
| 4,319,298 A | * | 3/1982 | Davis et al. ............... | 361/24 |
| 4,547,826 A | * | 10/1985 | Premerlani ............... | 361/25 |
| 4,939,437 A | * | 7/1990 | Farag et al. ............... | 318/473 |
| 5,323,287 A | | 6/1994 | Peter | |
| 6,140,786 A | * | 10/2000 | Lee ............... | 318/471 |
| 7,129,660 B2 | * | 10/2006 | Fujita et al. ............... | 318/434 |
| 7,222,050 B2 | * | 5/2007 | Kakegawa et al. ............... | 702/183 |

FOREIGN PATENT DOCUMENTS

| JP | Y2-H06-049074 | 1/1987 |
|---|---|---|
| JP | A-H11-164472 | 6/1999 |

* cited by examiner

Primary Examiner—Bentsu Ro
(74) Attorney, Agent, or Firm—Posz Law Group, PLC

(57) ABSTRACT

A motor controller includes: a motor control part for driving and controlling a motor; an estimated temperature computing part for computing an estimated temperature of a winding of the motor; and a motor protecting part for protecting the motor from being burned when the estimated temperature becomes larger than a predetermined temperature. A temperature rise value of the estimated temperature is computed according to operating conditions of the motor at the time of passing electric current through the winding. This temperature rise value is added to an estimated temperature stored in the estimated temperature storing part to update the estimate temperature. To compute the temperature rise value, an optimum temperature rise value is computed by the use of a plurality of temperature-rise value computing expressions.

5 Claims, 5 Drawing Sheets

MOTOR CONTROLLER

CROSS REFERENCE TO RELATED APPLICATION

This application is based upon and claims the benefit of priority of Japanese Patent Application No. 2005-225790 filed on Aug. 3, 2005, the content of which is incorporated herein by reference.

FIELD OF THE INVENTION

The present invention relates to a motor controller and, in particular, to a motor controller that has the function of computing an estimated temperature of a motor so as to protect the motor from being burned.

BACKGROUND OF THE INVENTION

Conventionally, in order to protect a motor from being burned, a protection element such as a bimetal or a PTC is built in a motor housing. When a motor abnormally generates heat, an electric circuit is interrupted by this protection element and the passing of electric current through the motor is stopped.

When the above-mentioned protection element is arranged near the motor, the size of the motor is enlarged, which results in increasing the size of an entire device. For this reason, a motor controller described in JP-H11-164472-A is not provided with the above-mentioned protection element but is constructed in such a way that a control section for driving and controlling the motor computes an estimated temperature of the motor from the magnitude of voltage applied to the motor, a period of time during which voltage is applied to the motor, and the last estimated temperature value. In the motor controller described in JP-H11-164472-A, when a computed estimated temperature becomes not less than a predetermined overheat protection temperature, the driving of the motor is stopped and the motor is held to be stopped until the estimated temperature reaches an overheat protection release temperature.

However, when the operating load of the motor is shifted from an assumption range in a design stage by a secular change or the like, the rotational speed of the motor is changed to increase the error of a computed estimated temperature. With this, it is likely that when the motor should not be stopped under normal circumstances, the motor is stopped by the function of protecting the motor from being burned or that when the motor should be stopped, the motor is not stopped and is burned.

Moreover, there is proposed a motor controller that sets a continuous operating time of a motor for the rotational speed of the motor and stops the motor when the operating time of the motor is over the continuous operating time. However, also in this case, it is likely that because of a difference in power supply voltage and a secular change, the function of protecting the motor from being burned detects an overheating state falsely or, conversely, does not detect an overheating state, which results in burning the motor. Moreover, in the above-mentioned motor controller, when the motor controller is mounted in a different system, the characteristics of the rotational speed of the motor and the continuous operating time need to be designed again, which results in increasing cost.

SUMMARY OF THE INVENTION

In view of the above-mentioned problems, the object of the present invention is to provide a motor controller that can protect a motor from being burned in an appropriate manner and can adjust a parameter for computing the estimated temperature of the motor with ease irrespective of a secular change, the installation surroundings of a product, and the like.

A motor controller includes: a motor control part for driving and controlling a motor; an estimated temperature computing part for computing an estimated temperature of a winding of the motor; and a motor protecting part for protecting the motor from being burned when the estimated temperature becomes larger than a predetermined temperature. The estimated temperature computing part includes: estimated temperature storing means for storing the estimated temperature; temperature rise value computing means for computing a temperature rise value of the estimated temperature according to operation conditions of the motor when electric current passes through the winding; and estimated temperature updating means that adds the temperature rise value computed by the temperature rise value computing means to an estimated temperature stored in the estimated temperature storing means to update the estimated temperature.

Furthermore, the temperature rise value computing means includes a plurality of temperature-rise value computing expressions for computing the temperature rise value, and computes an optimum temperature rise value by using the plurality of temperature-rise value computing expressions.

BRIEF DESCRIPTION OF THE DRAWINGS

Other features and advantages of the present invention will be appreciated, as well as methods of operation and the function of the related parts, from a study of the following detail description, the appended claims, and the drawings, all of which form a part of this application.

DESCRIPTION OF THE PREFERRED EMBODIMENTS

Hereinafter, an embodiment of the present invention will be described with reference to the drawings. Of course, the construction and the procedure to be described below do not limit the present invention but can be variously modified according to the spirit of the invention.

Figure 1:
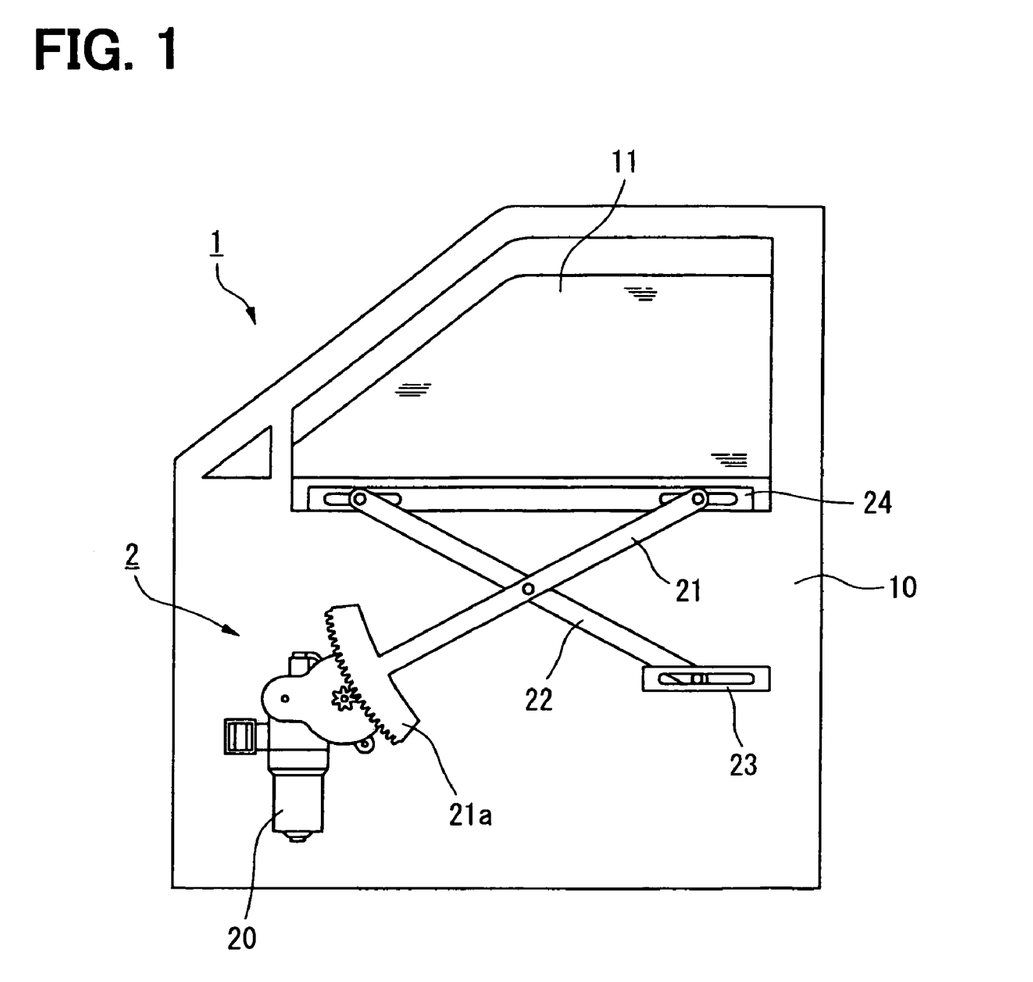
FIG. 1 is an explanatory diagram of a power window device according to one embodiment of the present invention.
Figure 2:
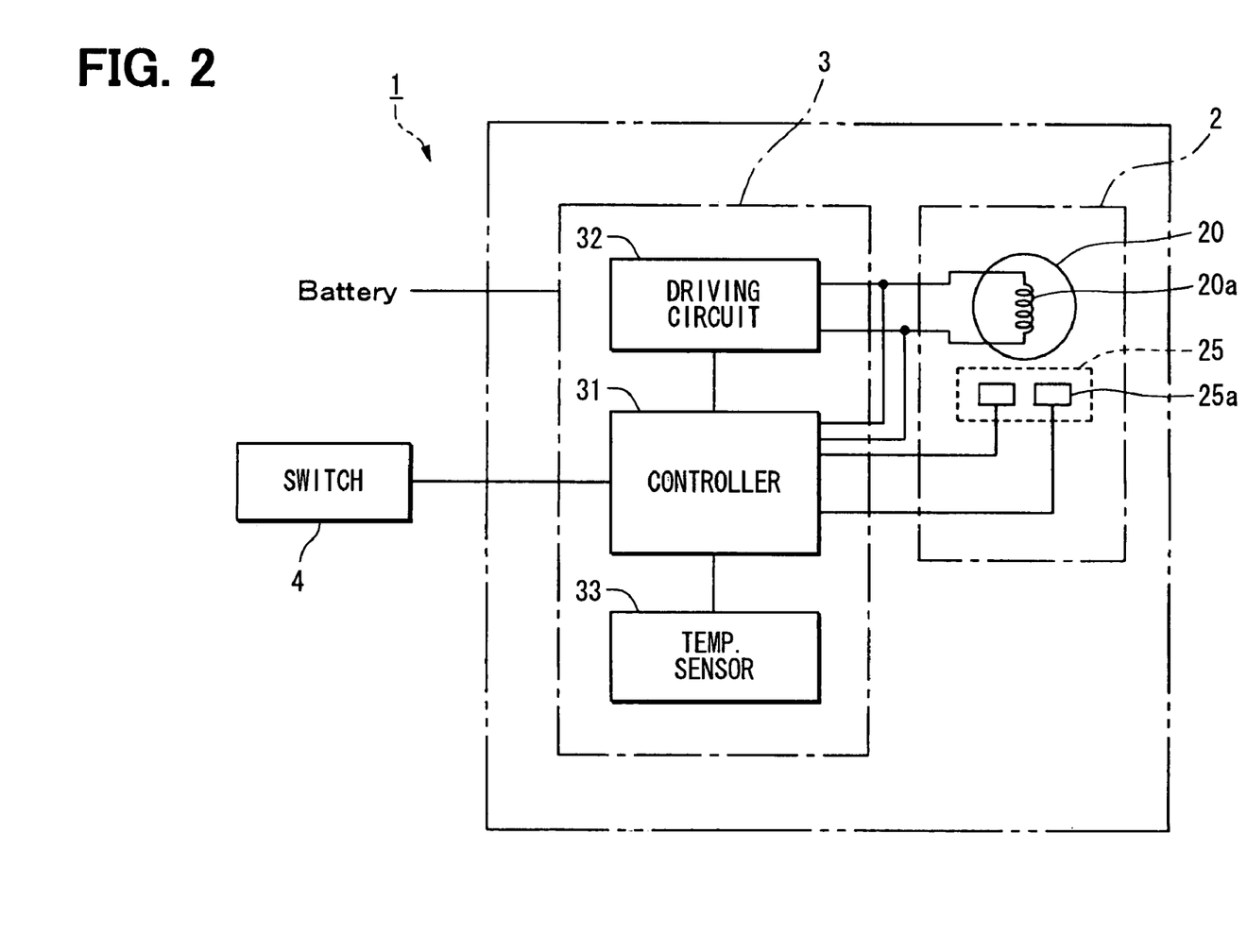
FIG. 2 is an electric configuration diagram of the power window device in FIG. 1.
Figure 3:
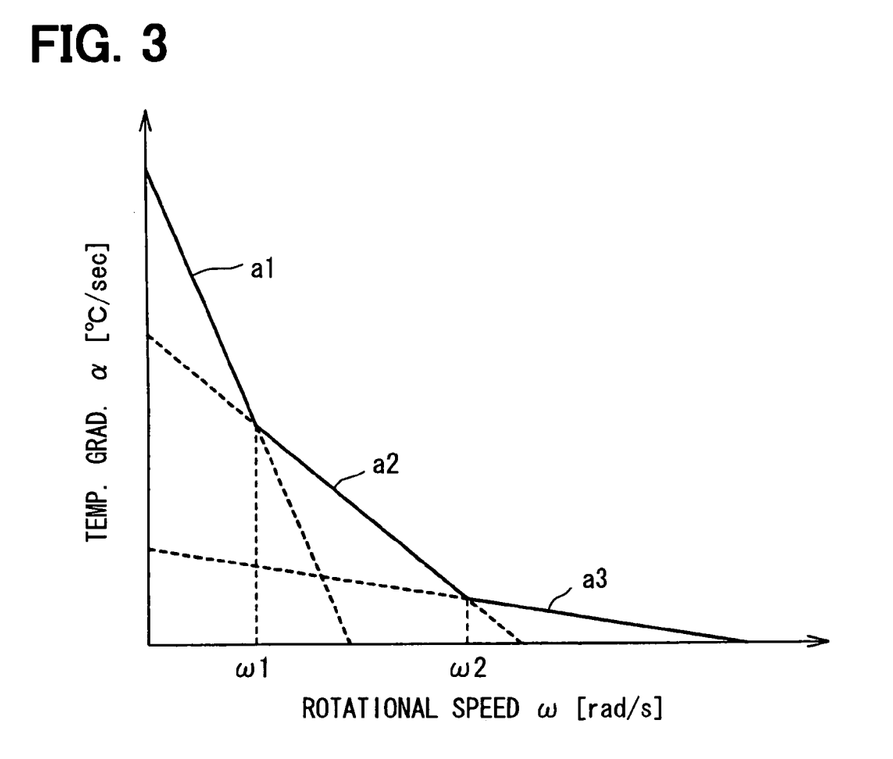
FIG. 3 is a graph to show the relationship between the rotational speed of a motor and a temperature gradient.
Figure 4:
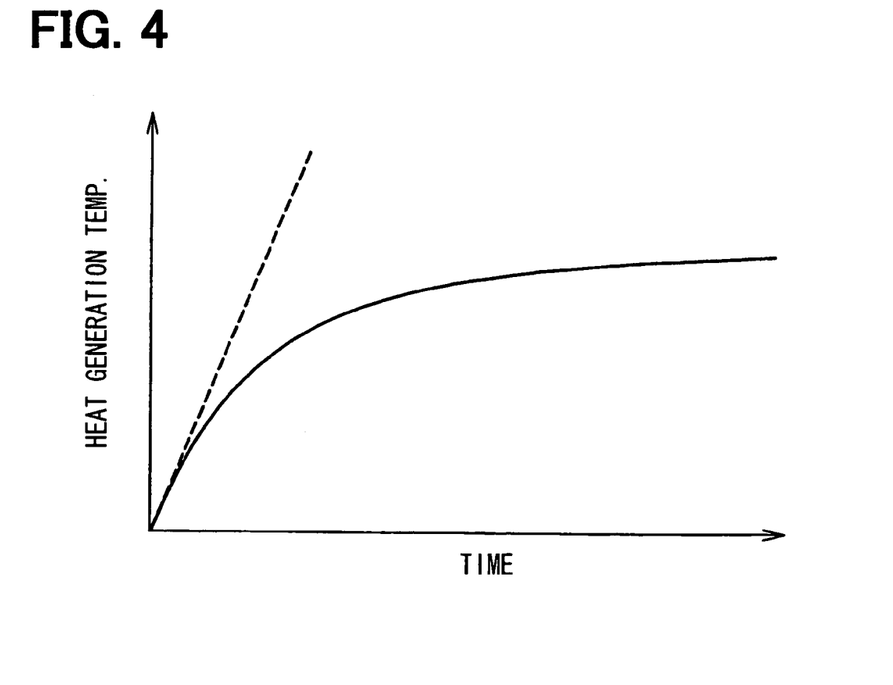
FIG. 4 is a graph to show a change in the heat generation temperature of a motor with respect to time.
Figure 5:
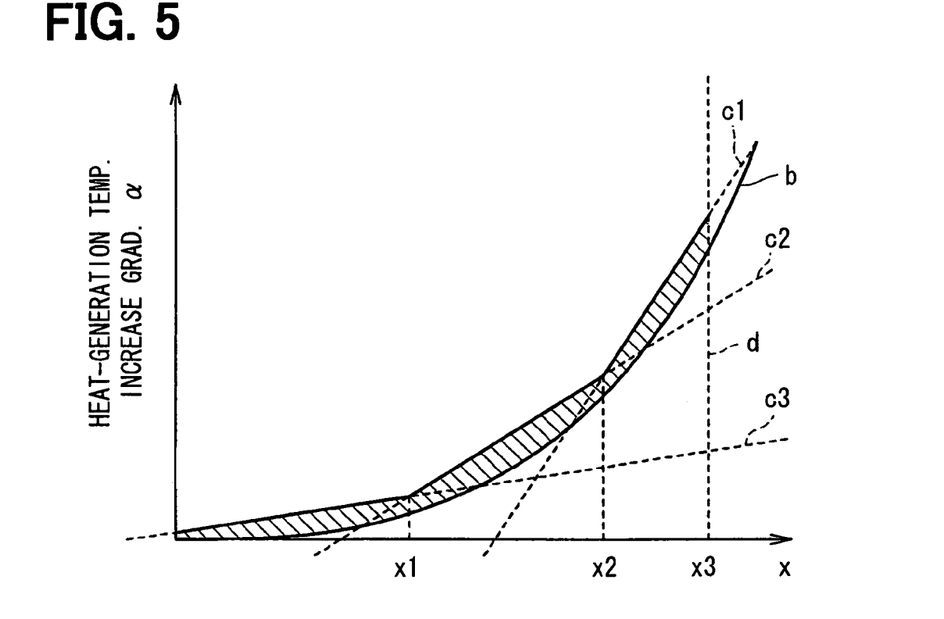
FIG. 5 is an explanatory graph to compute a temperature-rise value computing expression.
Figure 6:
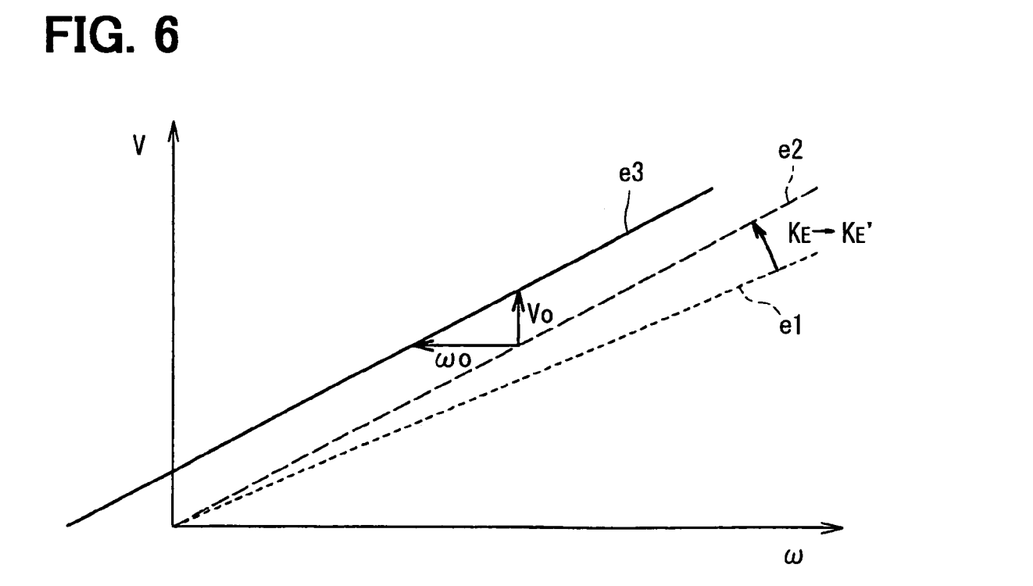
FIG. 6 is an explanatory graph to compute a temperature-rise value computing expression.
Figure 7:
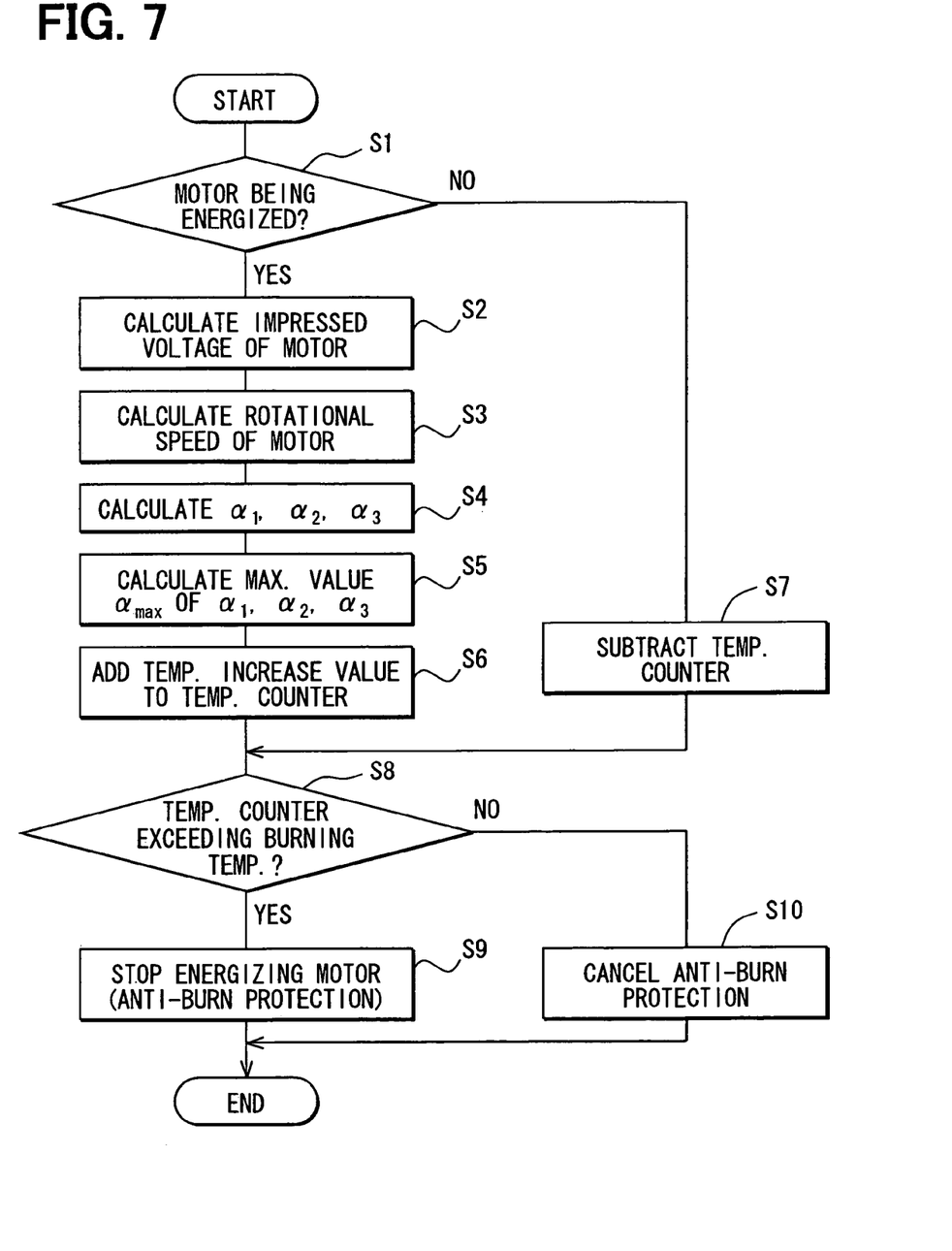
FIG. 7 is a flow diagram of the processing of computing an estimated temperature of a motor.

FIGS. 1-7 are diagrams relating to the embodiment of the present invention. FIG. 1 is an explanatory diagram of a power window device, FIG. 2 is an electric configuration diagram of the power window device in FIG. 1, FIG. 3 is a graph to show the relationship between the rotational speed of a motor and a temperature gradient, FIG. 4 is a graph to show a change in the heat generation temperature of a motor with respect to time, FIGS. 5 and 6 are explanatory graphs to compute a temperature-rise value computing expression, and FIG. 7 is a flow diagram of the processing of computing an estimated temperature of a motor.

Hereinafter, an example will be described in which the motor controller of the present invention is applied to a power window device. An explanatory diagram of a power window device 1 of this embodiment (hereinafter, referred to as "device 1") is shown in FIG. 1 and its electric configuration diagram is shown in FIG. 2. The power window device 1 of this embodiment is such that moves up and down (closes and opens) a window glass 11 as a moving member arranged in a door 10 of a vehicle by rotating and driving a motor 20. The power window device 1 has constituent elements of: a moving up/down mechanism 2 for closing and opening the window glass 11; a control section 3 for controlling the operation of the moving up/down mechanism 2; and an operating switch 4 by which an occupant issues a command of operation.

In this embodiment, the window glass 11 is moved up and down between an upper totally-closed position and a lower fully-opened position along a rail (not shown).

The moving up/down mechanism 2 of this embodiment has constituent elements of: the motor 20 that has a speed reducing mechanism fixed to the door 10; a moving up/down arm 21 that has a gear 21a shaped like a fan and driven by the motor 20; a driven arm 22 that crosses the moving up/down arm 21 and is rotatably supported by the arm 21: a fixed channel 23 fixed to the door 10; and a glass-side channel 24 integrated with the window glass 11.

The motor 20 of this embodiment is constructed in such a way that when the motor 20 is supplied with electric power from the control section 3, the motor 20 has electric current passed through the winding 20a of its rotor to thereby produce a magnetic attracting action between the rotor and a stator having a magnet, whereby the rotor is rotated normally and reversely. In the moving up/down mechanism 2 of this embodiment, when the moving up/down arm 21 and the driven arm 22 swing according to the rotation of the motor 20, the moving up/down arm 21 and the driven arm 22 have their respective end parts restricted so as to slide by the channels 23, 24 and move as an X link to move up and down the window glass 11.

The motor 20 of this embodiment is integrally provided with a rotation detecting device (position detecting device) 25. The rotation detecting device 25 is set so as output a pulse signal synchronous with the rotation of the motor 20 to the control section 3. The rotation detecting device 25 of this embodiment is constructed so as to detect a magnetic change in the magnet turning with the output shaft of the motor 20 by a plurality of Hall elements 25a.

The control section 3 computes the moving up/down positions of the window glass 11 by this pulse signal. Moreover, the control section 3 can compute the rotational speed of the motor 20 (motor rotation speed) or the moving up/down speed of the window glass 11 corresponding to this by the intervals of the pulse signals.

In this embodiment, a device using the Hall elements is adopted as the rotation detecting device 25 but a device used as the rotation detecting device 25 is not limited to this, that is, an encoder may be adopted if the encoder can detect the rotational speed of the motor 20. Moreover, in this embodiment, to detect such a rotational speed of the output shaft of the motor 20 that responds to the movement of the window glass 11, the motor 20 is integrally provided with the rotation detecting device 25 but a device to detect the movement of the glass window 11 is not limited to this. The moving speed of the window glass 11 may be detected by well-known means.

The control section 3 of this embodiment is constructed in such a way that a controller 31, a drive circuit 32, and a temperature sensor 33 are arranged on a substrate. These parts are supplied with electric power necessary for operation from a battery mounted in the vehicle.

The controller 31 of this embodiment is constructed of a microcomputer including: a CPU; a memory such as a ROM and a RAM; an input circuit; and an output circuit. The CPU, the memory, the input circuit, and the output circuit are connected to each other through a bus.

The controller 31 usually rotates the motor 20 normally and reversely through the drive circuit 32 on the basis of an operation signal from the operating switch 4 to thereby open and close the window glass 11.

The drive circuit 32 of this embodiment is constructed of an IC including an FET and changes the polarity of electric power supplied to the motor 20 on the basis of a control signal from the controller 31. That is, when the drive circuit 32 receives a normal rotation command signal from the controller 31, the drive circuit 32 supplies electric power to the motor 20 so as to rotate the motor 20 in a normal rotational direction. When the drive circuit 32 receives a reverse rotation command signal from the controller 31, the drive circuit 32 supplies electric power to the motor 20 so as to rotate the motor 20 in a reverse rotational direction. The drive circuit 32 may be constructed so as to change the polarity by the use of a relay circuit. Moreover, the drive circuit 32 may be constructed so as to be incorporated into the controller 31.

The temperature sensor 33 of this embodiment is constructed so as to detect temperature around the substrate having the controller 31 and the like arranged thereon and is arranged at a position away from the motor 20 in this embodiment.

The controller 31 receives an ambient temperature detection signal from the temperature sensor 33 and computes the ambient temperature around the substrate on the basis of this signal.

Moreover, the controller 31 as a motor control part has a voltage sensor (not shown) for sensing the magnitude of voltage applied to the motor 20 via the drive circuit 32 and monitors the voltage applied to the motor constantly. Moreover, the controller 31 counts a period of time during which electric current is passed.

Moreover, as described above, the controller 31 monitors the rotational speed of the motor 20 by the pulse signal from the rotation detecting device 25.

The controller 31 stores the estimated temperature of the winding 20a (motor estimation temperature) in a temperature counter as estimated temperature storing means set in the memory. Moreover, the controller 31 stores reference data for computing this estimated temperature in the memory. The controller 31 as estimated temperature computing means computes the fluctuation (correction value) of the estimated temperature from the ambient temperature, the applied voltage, the period of time during which electric current is passed, the rotational speed of the motor, and the reference data of them, and the present estimated temperature, and adds this fluctuation to the present estimated temperature to thereby compute a new estimated temperature. This processing of computing the estimated temperature is repeatedly performed by repetition processing at intervals of a predetermined time and the estimated temperature is updated at intervals of this repetition processing time.

The controller 31 as a motor protecting part stops electric power supply to the winding 20a from the drive circuit 32 according to this estimated temperature to thereby prevent the winding 20a from being burned. In this manner, in the device 1 of this embodiment, the electric power supply is stopped on the basis of such estimated temperature of the winding 20a that is computed by the controller 31 to thereby protect the winding 20a from being burned. In this embodiment, a comparatively large protection element such as a bimetal or a PTC does not need to be arranged in the main body of the motor 20 so as to detect the temperature of the winding 20a and hence the motor 20 can be reduced in size.

When electric current is passed through the winding 20a from a state where the motor 20 is stopped to operate the motor 20, the controller 31 of this embodiment computes the correction value (temperature rise value) of the estimated temperature by the use of temperature-rise value computing expressions A1, A2, A3, which will be described later, at intervals of a predetermined repetition time and updates the estimated temperature stored in the temperature counter.

In contrast, while electric current is not passed through the winding 20a and hence the motor is stationary, the controller 31 performs predetermined temperature subtraction processing. This temperature subtraction processing is the processing of performing subtractions until the estimated temperature becomes the ambient temperature and subtracts a predetermined correction value (subtraction temperature) from the value of the temperature counter at intervals of a predetermined time.

The operating switch 4 of this embodiment is constructed of a toggle type switch, which can be operated in two steps, or the like and is provided with an opening switch, a closing switch, and an automatic switch. When an occupant operates this operating switch 4, a command signal to open or close the window glass 11 is outputted to the controller 31.

Specifically, when the operating switch 4 is operated one step to one end side, the opening switch is turned on and a normal opening command signal for opening the window glass 11 normally (that is, for opening the window glass 11 only while the opening switch is being operated) is outputted to the controller 31. Moreover, when the operating switch 4 is operated one step to the other end side, the closing switch is turned on and a normal closing command signal for closing the window glass 11 normally (that is, for closing the window glass 11 only while the closing switch is being operated) is outputted to the controller 31.

While the controller 31 receives the normal opening command signal from the operating switch 4, the controller 31 drives the motor 20 through drive circuit 32 to open the window glass 11 normally. By contrast, while the controller 31 receives the normal closing command signal from the operating switch 4 (while the operating switch 4 is being operated), the controller 31 drives the motor 20 through drive circuit 32 to close the window glass 11 normally.

Moreover, when the operating switch 4 is operated two steps to one end side, both of the opening switch and the automatic switch are turned on to thereby output an automatic opening command signal for opening the window glass 11 automatically (that is, for opening the window glass 11 to a fully-opened position even when operating the operating switch 4 is stopped) to the controller 31. Moreover, when the operating switch 4 is operated two steps to the other end side, both of the closing switch and the automatic switch are turned on to thereby output an automatic closing command signal for closing the window glass 11 automatically to the controller 31.

Moreover, when the controller 31 receives an automatic opening command signal from the operating switch 4, the controller 31 drives the motor 20 via the drive circuit 32 to thereby open the window glass 11 automatically to the fully-opened position. By contrast, when the controller 31 receives an automatic closing command signal from the operating switch 4, the controller 31 drives the motor 20 via the drive circuit 32 to thereby close the window glass 11 automatically to the totally-closed position.

Next, the principle of deriving a temperature-rise value computing expression in the device 1 of this embodiment will be roughly described. The temperature-rise value computing expression is used for computing a temperature rise value of the estimated temperature of the motor in operation.

FIG. 3 is a graph of temperature-rise value computing expressions A1, A2, and A3 used for computing a temperature rise value. Straight lines a1, a2, and a3 correspond to the temperature-rise value computing expressions A1, A2, and A3, respectively. A vertical axis in FIG. 3 denotes a temperature gradient of a temperature rise value per unit time (heat-generation temperature rise gradient) $\alpha$ (° C./s) and a horizontal axis denotes a motor rotation speed $\omega$ (rad/s).

Each of the computing expressions A1, A2, and A3 is expressed by the sum of linear functions in variables of a motor-applied voltage V (corresponding to electric power voltage in this embodiment) and the motor rotation speed $\omega$ and computes each of temperature gradients $\alpha 1$, $\alpha 2$, and $\alpha 3$. In FIG. 3, the computing expressions A1, A2, and A3 are expressed on condition that the motor-applied voltage V is set at a predetermined value and that the variable is only the motor rotation speed $\omega$.

When the motor-applied voltage V is set at a fixed value in this manner, the temperature-rise value computing expressions A1, A2, and A3 become linear functions of the motor rotation speed $\omega$ and cross each other.

The straight lines a1, a2, and a3 expressed by the computing expressions A1, A2, and A3 have negative gradients, respectively, and the order of magnitude (absolute value) of the gradients, from largest, is the computing expressions A1, A2, and A3. The straight lines expressed by the computing expressions A1, A2 cross each other at a motor rotation speed $\omega 1$ and the straight lines expressed by the computing expressions A2, A3 cross each other at a motor rotation speed $\omega 2$ ($\omega 2 > \omega 1$).

In this embodiment, an optimum value of the temperature gradients computed by the use of these computing expressions is selected and in this embodiment, a maximum value of these is selected as the optimum value and is adopted as a correction value of the estimated temperature. Hence, when the motor rotation speed $\omega$ is $\omega 1$ or smaller (when the motor is rotated at an extremely low speed), a value computed from the computing expression A1 is adopted. When the motor rotation speed $\omega$ ranges from $\omega 1$ to $\omega 2$ (when the motor is rotated at a low speed), a value computed from the computing expression A2 is adopted. When the motor rotation speed $\omega$ is $\omega 2$ or larger (when the motor is rotated at a high speed), a value computed from the computing expression A3 is adopted. In other words, of the straight lines a1, a2, and a3, solid line portions are actually adopted as optimum values. That is, the computing expressions A1 to A3 are selected appropriately according to the motor rotation speed.

A procedure for deriving the computing expressions A1, A2, and A3 is as follows.

Assuming that: the back electromotive force of the motor 20 is E(V); a back electromotive force constant is KE(Vs/rad); and a motor rotation speed is ω (rad/s), the relationship between the back electromotive force E of the motor 20 and the motor rotation speed ω is expressed by $$E = KE \cdot \omega \quad (1)$$

With this, assuming that an armature resistance is Ra (Ω) and a motor current is Ia (A), the motor-applied voltage V (V) is expressed by $$V = E + Ra \cdot Ia = KE \cdot \omega + Ra \cdot Ia \quad (2)$$

When the expression (2) is used, a motor copper loss P(W) is expressed by $$P = 1/2 \cdot Ra \cdot Ia2 = (V - KE \cdot \omega)2/2Ra \quad (3)$$

Assuming that the thermal resistance and thermal capacity of the motor 20 are U(° C./W) and C (J/° C.), the heat generation temperature θ (° C.) of the motor 20 can be expressed in the following manner by a time function.

$$\theta = P \cdot U \cdot \{1 - \exp(-t/UC)\} \quad (4)$$

A curve expressing the heat generation temperature θ is shown by a solid line in FIG. 4.

When the estimated temperature is updated by repetition processing at intervals of a predetermined time, the estimated temperature can be updated by the use of a temperature rise gradient (rate of change of temperature) at the time of update. Thus, to simplify computation processing, if the heat generation temperature θ is approximated by a tangent at time t=0, because θ'(0)=P/C, the following expression can be obtained.

$$\theta \cong (V - KE \cdot \omega)2/2CRa \cdot t \quad (4)$$

A straight line expressing a heat generation temperature θ by an approximate expression is shown by a broken line in FIG. 4.

In this embodiment, the gradient of this approximate expression is used as a heat-generation temperature rise gradient α (heat-generation temperature increase gradient) at the time of updating the estimated temperature. As is clear from expression (4), the heat-generation temperature rise gradient α has variables of the motor-applied voltage V and the motor rotation speed ω (and back electromotive constant KE).

Further, when a variable portion x is defined as (V−KE·ω), from expression (4), the heat-generation temperature rise gradient α is expressed by $$\alpha = x2/2CRa \quad (5)$$

α is expressed by a quadratic function. FIG. 5 shows a theoretical change in the heat-generation temperature rise gradient α with respect to x (curve b).

Moreover, in FIG. 5 are shown straight lines c1, c2, and c3 by which the curve b is approximated in consideration of variations and a change by temperature in an armature resistance Ra, and variations or errors in the thermal capacity C. The variations includes variations caused by an individual difference and variations caused by a secular change, and these variations are expressed by $$\alpha n = Kxn \cdot x + \alpha On \text{ (where } n=1, 2, 3) \quad (6)$$

In expression (6), αn is expressed by a linear function of x. Here, Kxn (where n=1, 2, 3) are the gradients of the straight lines c1, c2, and c3 and αOn (where n=1, 2, 3) are values of the points of intersections of the straight lines c1, c2, and c3 and an a axis where x=0.

The straight lines c2, c3 cross at x1 and the straight lines c1, c2 cross at x2 (x2>x1). Moreover, a straight line d expresses a maximum value (x3) of x from a practical viewpoint.

By approximating the curve b by a plurality of straight lines in this manner, the processing of computing a heat-generation temperature rise gradient α with respect to x (that is, V, ω) can be simplified.

The straight lines c1, c2, and c3 are shifted in the direction of +α so as to make the value of a temperature gradient larger than the curve b in consideration of the above-mentioned variations. That is, in this embodiment, the straight lines c1, c2, and c3 make allowance in advance for variations and a change by temperature in the armature resistance Ra, and variations or errors of the thermal capacity C and factors in allowance (degree of allowance) for variations in the above-mentioned respective factors so as to protect the winding 20a reliably from being burned before the winding 20a reaches a burning temperature. Thus, a region surrounded by the curve b expressing the heat-generation temperature rise gradient α and the straight lines c1, c2, and c3 corresponds to this allowance.

Moreover, as to an allowance for x, allowances for the errors of the voltage sensor for sensing a voltage value and the rotation detecting device 25 and the error of the back electromotive constant KE are considered. That is, in FIG. 6, a horizontal axis denotes the motor rotation speed ω and a vertical axis denotes a motor-applied voltage V, and the relationship between ω and V for x=0 is expressed by a straight line (broken line) e1.

The relationship between the motor rotation speed ω and the motor-applied voltage V when KE' is used in place of KE (KE'>KE) in consideration of an allowance for variations in the back electromotive constant KE is expressed by a straight line (broken line) e2.

Further, when an allowance for variations in the voltage sensor is set at $V_0$ and an allowance for variations in the rotation detecting device 25 is set at $-\omega_0$, in FIG. 6, the straight line e2 is shifted by $V_0$ in the direction of +V and by $\omega_0$ in the direction of $-\omega_0$.

The relationship between the motor rotation speed ω and the motor-applied voltage V when allowances are made for variations in the back electromotive constant KE, the voltage sensor, and the rotation detecting device 25 is expressed by a straight line e3.

When the allowances are set in this manner, the expression (6) is expressed by the following expression.

$$\alpha n = Kxn \cdot \{(V-V_0) - KE \cdot (\omega - \omega_0)\} + \alpha_0 n \text{ (where } n=1, 2, 3) \quad (7)$$

In this manner, the computing expressions A1, A2, and A3 are derived.

A change in the temperature gradients αn (where n=1, 2, 3), in the case where the motor-applied voltage V is set at a predetermined value in this expression 7 and where a vertical axis denotes the temperature gradient α and where a horizontal axis denotes the motor rotation speed ω, is expressed by the straight lines a1, a2, and a3 in FIG. 3. Since each of the computing expressions A1 to A3 is expressed by the sum of the linear functions of the motor rotation speed ω and the motor-applied voltage V, the computing expressions A1 to A3 can be adjusted easily by adding the allowance or by changing the factor.

In the device 1 of this embodiment, the controller 31 computes the estimated temperature. Specifically, the controller 31 has the temperature counter and adds the correction value (varying temperature), which is computed by the repetition processing at intervals of a predetermined time, to this temperature counter to update the estimated temperature of the winding 20a constantly.

As described above, when the motor is operated, every time the repetition processing is performed, the controller 31 computes the temperature rise value from the ambient temperature, the motor-applied voltage, the period of time during which electric current is passed, the motor rotation speed, the reference data, and the present estimated temperature by the use of the computing expressions A1 to A3, and adds this computed temperature rise value to the present temperature counter to thereby update the temperature counter. When the temperature counter reaches a predetermined temperature value, the controller 31 stops electric power supply to the motor 20 by the drive circuit 32.

Next, the processing of updating an estimated temperature will be described on the basis of FIG. 7.

A processing procedure shown in FIG. 7 is performed repeatedly at intervals of a predetermined processing time by the controller 31.

First, in step S1, the controller 31 determines whether or not electric power is supplied to the motor 20. When electric current is not passed through the motor 20 (step S1: No), the controller 31 performs temperature subtraction processing in step S7. When electric current is not passed through the motor, the temperature of the motor drops to the ambient temperature. In this temperature subtraction processing, the controller 31 computes a temperature drop (subtraction temperature) dropping during a repetition processing time and adds this subtraction temperature of a negative value to the value of the temperature counter to update the value of the temperature counter. With this, the value of the temperature counter drops to the ambient temperature.

In contrast, when electric current is passed through the motor (step S1: Yes), the controller 31 computes a motor-applied voltage V in step S2. The controller 31 senses a motor-applied voltage V by means of the voltage sensor (not shown).

When the controller 31 computes the motor-applied voltage, the controller 31 computes a motor rotation speed $\omega$. The controller 31 computes the motor rotation speed $\omega$ on the basis of a pulse signal from the rotation detecting device 25.

Subsequently, the controller 31 as the temperature rise value computing means applies the motor-applied voltage V computed in step S2 and the motor rotation speed $\omega$ computed in step S3 to the temperature-rise value computing expressions A1 to A3 to compute temperature gradients $\alpha 1$, $\alpha 2$, and $\alpha 3$ (step S4). In this embodiment, the motor operation conditions (motor-applied voltage V, motor rotation speed $\omega$) may be varied by a secular change and surroundings and hence the temperature gradient $\alpha$ is computed in consideration of these.

Next, the controller 31 as estimated temperature updating means selects a maximum temperature gradient $\alpha$ max of the temperature gradients $\alpha 1$, $\alpha 2$, and $\alpha 3$ computed in step S4 (step S5).

The controller 31 adds a correction value (temperature rise value) to the present value of the temperature counter to update the value of the temperature counter. The correction value is computed by multiplying the temperature gradient $\alpha$ max by a repetition processing time.

When the controller 31 updates the value of the temperature counter, the controller 31 determines whether or not the value updated in step S8 is larger than a previously set burning temperature.

When the updated value is larger than the burning temperature (step S8: Yes), the controller 31 stops passing electric current through the motor 20 in step S9 to protect the motor 20 from being burned. In contrast, when the updated value is not larger than the burning temperature (step S8: No), the controller 31 does not protect the motor 20 from being burned but continues passing electric current through the motor 20.

Here, in this embodiment, passing electric current through the motor 20 is stopped so as to protect the motor 20 from being burned. However, the method for protecting the motor 20 from being burned is not limited to this but the motor-applied voltage is lowered or the electric current passed through the motor 20 is reduced to make a motor temperature hard to rise to thereby protect the motor 20 from being burned.

In the above-mentioned embodiment, the temperature gradients $\alpha 1$ to $\alpha 3$ are computed by the three temperature-rise value computing expressions A1 to A3. However, the number of temperature-rise value computing expressions is not limited to three but it is only necessary to set a plurality of temperature-rise value computing expressions.

Moreover, in the above-mentioned embodiment has been described the embodiment in which the present invention is applied to the power window device 1. However, the application of the present invention is not limited to this but the present invention can be applied to all devices having motors.

That is, the present invention is constructed in such a way that an optimum temperature rise value out of the temperature rise values computed from the plurality of temperature-rise value computing expressions according to the operating conditions of the motor is selected and is added to the present estimated temperature value of the winding to thereby update the estimated temperature. With this, even when the operating conditions of the motor are varied, the estimated temperature can be updated by the optimum temperature rise value and hence the motor can be reliably protected from being burned. Moreover, since the estimated temperature of the winding can be computed according to variations in the actual temperature of the winding of the motor, the motor can be reliably protected from being burned in response to an update timing without a temporal deviation.

Moreover, it is preferable that the above-mentioned temperature rise value computing means selects the largest value of the temperature rise values computed from the plurality of temperature-rise value computing expressions as an optimum temperature rise value. If the largest value of the plurality of computed temperature rise values is selected as an optimum temperature rise value, it does not occur that an estimated temperature is computed to be lower than the actual temperature of the winding, which hence prevents the motor from being burned.

Moreover, the above-mentioned temperature rise value computing means can be constructed so as to compute a temperature rise value per unit operating time of the motor and the above-mentioned estimated temperature updating means can be constructed so as to update the estimated temperature at intervals of the unit operating time of the motor. With this, the estimated temperature can be made to follow the actual temperature of the winding reliably.

Moreover, it is preferable that the above-mentioned temperature-rise value computing expressions are expressed by the sum of the linear functions of the motor rotation speed and the motor-applied voltage. If the temperature-rise value computing expressions are expressed in this manner by the sum of the linear functions of the motor rotation speed and the motor-applied voltage, a rise temperature can be easily computed and processing load can be reduced. Further, the temperature-rise value computing expressions can be easily changed.

Moreover, it is preferable that the above-mentioned temperature-rise value computing expressions have allowances for the motor rotation speed and the motor-applied voltage added thereto. With this, even if errors arise in the detection values of the motor rotation speed and the motor-applied voltage, it is possible to prevent the motor from being burned. Moreover, the temperature-rise value computing expressions can be adjusted easily by changing the allowances.

That is, according to the motor controller of the present invention, at the time of computing the estimated temperature of the winding of the motor in operation, an optimum value selected from the temperature rise values (correction values) computed by the plurality of temperature-rise value computing expressions according to the operating conditions of the motor is added to the present estimated temperature to update the estimated temperature. Thus, the estimated temperature of the motor can be reliably computed and the motor can be protected from being burned irrespective of fluctuations in the operating conditions of the motor. Moreover, since the temperature-rise value computing expressions are expressed by the sum of the linear functions of the motor rotation speed and the motor-applied voltage, the temperature-rise value computing expressions can be easily adjusted by adding margins in a design stage.

The above description of the present invention merely describes just the typical embodiments of the present invention. Therefore, modifications not departing from the spirit of the present invention are included in the scope of the present invention. Such modifications are not departed from the spirit and scope of the present invention.

What is claimed is:

1. A motor controller comprising:
   a motor control part for driving and controlling a motor;
   an estimated temperature computing part for computing an estimated temperature of a winding of the motor; and
   a motor protecting part for protecting the motor from being burned when the estimated temperature becomes larger than a predetermined temperature, wherein
   the estimated temperature computing part includes: estimated temperature storing means for storing the estimated temperature; temperature rise value computing means for computing a temperature rise value of the estimated temperature according to operation conditions of the motor when electric current passes through the winding; and estimated temperature updating means that adds the temperature rise value computed by the temperature rise value computing means to an estimated temperature stored in the estimated temperature storing means to update the estimated temperature, and
   the temperature rise value computing means includes a plurality of temperature-rise value computing expressions for computing the temperature rise value, and computes an optimum temperature rise value by using the plurality of temperature-rise value computing expressions.

2. The motor controller as in claim 1, wherein the temperature rise value computing means selects the largest temperature rise value out of temperature rise values computed by the plurality of temperature-rise value computing expressions as an optimum temperature rise value.

3. The motor controller as in claim 1, wherein the temperature rise value computing means computes a temperature rise value per unit operating time of the motor, and that the estimated temperature updating means updates the estimated temperature at intervals of the unit operating time of the motor.

4. The motor controller as in claim 1, wherein the temperature-rise value computing expressions are expressed by the sum of linear functions of a rotational speed of the motor and an applied voltage to the motor.

5. The motor controller as in claim 1, wherein the temperature-rise value computing expressions have allowances for at least a rotational speed of the motor and a motor-applied voltage added thereto.

* * * * *